Patented June 21, 1949

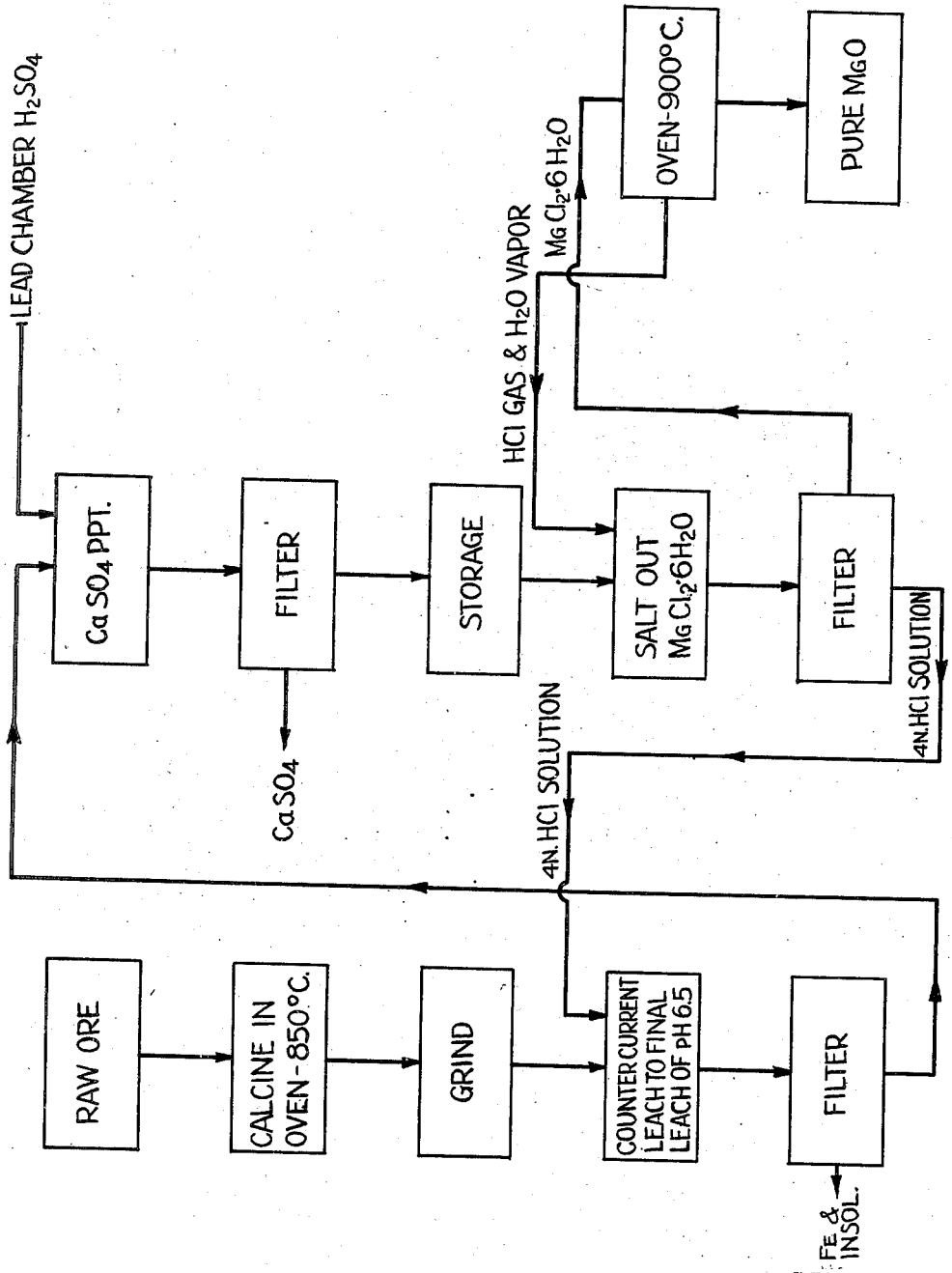

2,473,534

UNITED STATES PATENT OFFICE 2,473,534

PRODUCTION OF MAGNESIUM OXIDE

Rex R. Lloyd, Boulder City, Nev.

Application January 23, 1942, Serial No. 427,863

11 Claims. (Cl. 23—201)

(Granted under the act of March 3, 1883, as amended April 30, 1928; 370 O. G. 757)

This invention described herein may be manufactured and used by or for the Government for governmental purposes, without the payment to me of any royalty thereon.

My invention relates to the preparation of high grade magnesium oxide.

In the preparation of metallic magnesium, and at times also for other purposes, there is an advantage in making available a relatively pure high grade magnesium oxide product. Magnesium is produced in accordance with one conventional method by the electrolysis of magnesium chloride, and there is a definite advantage in having available a high grade magnesium oxide product for the preparation of magnesium chloride. In the copending application of Leland E. Yerkes, Serial No. 427,100, filed January 17, 1942, now Patent No. 2,431,723, a process is disclosed wherein the proportion of magnesium oxide soluble in a molten electrolyte comprising principally magnesium chloride is greatly increased and wherein the product reduced by electrolysis is, at least in great part, the dissolved magnesium oxide. This is another instance where the preparation of a substantially pure or high grade magnesium oxide is desirable.

Sources for the production of magnesium oxide are many and include naturally occurring ores such as magnesite, dolomite, brucite, and the like, magnesium bearing brines obtained from salt wells, bitterns, sea water, and the like. In employing such products for the production of magnesium in the form of a metal as well as in the form of a chloride or oxide, some purification has, at times, been resorted to but so far as I know, it is the usual practice to select only the highest grade of naturally occurring product with a minimum amount of impurities or such impurities as are readily handled and will introduce no unusual problems in processes commonly used.

In accordance with my invention, I employ a cyclic process which permits the utilization of substantially any source of magnesium although even in the practice of my invention economies may dictate the employment of fairly high grade raw material sources. In general, my invention involves the production of a magnesium chloride solution, the purification thereof, the precipitation of a hydrated magnesium chloride by the use of hydrogen chloride, the separation of the precipitate and the calcining of the hydrated magnesium chloride to substantially pure magnesium oxide. Hydrogen chloride is evolved in the final calcining step and this is employed in the cycle for the precipitation or salting out of the hydrated magnesium chloride. The magnesium oxide may be employed as such or may readily be converted to a highly pure magnesium chloride for electrolytic and other procedures.

While my invention may be practiced in various ways, depending upon the economies involved and the sources of raw material, I have shown in the drawing a flow sheet illustrating a complete cycle for the production of a high grade pure magnesium oxide from a raw ore such as magnesite. I shall first describe the invention in connection with the flow sheet shown in the drawing.

The raw ore is first prepared for leaching, by calcining, if necessary, to basic or caustic condition, and then crushed or ground. In general a temperature of approximately 850 degrees C. may be employed in the initial calcining step when required. Products such as magnesite and brucite in general may be leached without being first calcined. Crushing to about ¼" size in general is sufficient, but the product may be reduced to somewhat finer size with some advantage. The prepared product is leached with a solution of hydrochloric acid, preferably approximately a 4 normal solution resulting from a later step wherein the magnesium chloride is precipitated from solution. The leaching step with the hydrochloric acid solution results in the production of a solution containing substantially all of the magnesium in the basic magnesite product, as the chloride, together with impurities which will vary somewhat depending upon the nature of the ore. In general, these impurities are iron and alkaline earth metals, principally, calcium. The iron in solution may be precipitated out by bringing the pH of the filtrate to approximately pH 6.5. This may readily be done by controlling the amount of hydrochloric acid solution employed, the solution becoming more basic as leaching continues due to the basicity of the magnesium oxide of the ore. Alternatively, additional magnesium oxide may be added as required after the leaching operation has been completed. The filtrate is then subjected to filtration, sedimentation or the like to remove the precipitated iron and any other insolubles which may be present. The filtrate is then treated with a substance yielding sulphate ions such as sulphuric acid, sulphurous acid, magnesium sulfonate or sulphate or the like, to precipitate alkaline earth metals such as calcium as the sulphates. In this step, some excess acid may be employed to assure the precipitation of all of the calcium or other alkaline earth metal present, and any excess acid remaining after separation of the calcium sulphate may be neutralized by the use of high grade magnesite or the purified magnesium oxide. Some, but not too much, sulphate may be permitted in the magnesium chloride precipitation step. In general, it is desirable to add only sufficient sulphuric acid to precipitate those impurities which are insoluble as the sulphates. Iron may be precipitated after the alkaline earth metals, or they may be precipitated together.

The filtrate obtained after the purification of the solution is then treated with hydrogen chloride gas to salt out a hydrated magnesium chloride. Investigation indicates that the precipitated product is a hexahydrate but in any event it is a highly pure hydrated magnesium chloride which is readily calcined to a pure magnesium oxide product. The hydrogen chloride gas is obtained in the final calcining step, thereby maintaining the process as a closed cycle, as will be explained. After precipitation of the magnesium chloride, the filtrate, which may be controlled to maintain a 4 normal solution of hydrochloric acid, is passed back as the leach solution for the treatment of additional quantities of ores and the precipitate, after separation by decantation or filtration, is calcined to produce magnesium oxide. In this calcining step the precipitate may be treated initially at a relatively low temperature, of the order of 250 degrees C., to remove much of the water and some of the chlorine (as hydrogen chloride). The gases evolved from the initial calcining step may be returned to the cycle, preferably to the leach solution employed in the initial leaching operation. The partially dehydrated product is then introduced into a furnace and calcined at approximately 900 degrees C. In this final calcining step, water vapor and hydrogen chloride gas are driven off and the magnesium chloride is converted to a product comprising essentially magnesia. This gaseous admixture of water vapor and hydrogen chloride is introduced at atmospheric pressure as a source of hydrogen chloride for the salting out of the hexahydrate and concomitantly results in the production of a hydrochloric acid solution suitable for the initial leaching step.

The process as described may be utilized on any of the usual ores available such as those identified. When employing solutions such as from deep wells and the like the leaching step is not employed. The solution may, however, be purified in the general manner described, and a hydrated product may be precipitated out of solution for calcining to magnesia utilizing the gases evolved from this calcining step for the salting out or precipitation step.

While the process as described may be carried out with very good results, some modifications may be employed depending upon the economies involved. I may, for example, employ oxidizing agents such as nitric acid, sodium dichromate, or the like, to further the precipitation of heavy metals such as iron. In general, however, the use of such oxidizing agents is not required because ferric iron and most of the heavy metals which may be present may be precipitated in adequate amounts (usually as complex hydroxides) from a solution whose pH is in the range of 6 to 6.5, although some precipitation may be obtained, and it may be adequate, if the pH is controlled to a point between 3 and 7. Such proportions of the heavy metals as are not precipitated by proper control of pH, I have found, will remain in the solution as the chlorides during the salting out step, and further concentrations of these same metals in the leach liquor due to further leaching steps will cause them to be eliminated in subsequent purifications. In other words, I have found that iron and other heavy metals if not fully precipitated by a proper control of pH will remain in solution and will not be precipitated with the hydrated magnesium chloride in the salting out step.

The acid solution obtained after the precipitation of magnesium chloride is about 4 normal. The normality may be increased by operating under pressure. Since, in general, it is advisable to leach at atmospheric pressure, and since there will be a loss of hydrogen chloride from a solution greater than 4 normal at atmospheric pressure, the solution, if built up to a point above 4 normal, for example, by the use of pressure, should be diluted. It is preferred to employ for this purpose the vapors resulting from the initial dehydration of the hexahydrate. Considerable water is driven off during this initial heating step, probably five molecules of water of crystallization, together with some hydrochloric acid, some chlorine, and possibly some oxychlorides. The oxychlorides are relatively unstable and apparently break down to hydrochloric acid and oxygen. Whatever the exact analysis of the vapors resulting from the dehydration step may be, it is apparent that such hydrochloric acid as they may contain, as such or in the form of oxychlorides, is saved by returning all of these vapors to the system. This does not prevent some slight loss of hydrochloric acid in the process but the amount required to be added is relatively small and is suitably introduced at either the leaching stage or salting out stage. Referring again to the precipitation step, I have found that employing atmospheric pressure is apparently adequate under most conditions of operation. An excellent precipitation is obtained, and the entire process is more conveniently handled. A higher percentage of precipitation, and, indeed, more rapid precipitation, is obtained by increasing the pressure and introducing a greater proportion of hydrogen chloride gas. Where, in the process, economies indicate that the use of pressure is desirable, I may do so and mean to include the use of pressure for the precipitation step as a part of my invention.

I have not referred to the type of equipment employed in the practice of the invention. It is believed that those skilled in the art will understand that many different types of equipment suitable for the purpose may be employed. The calcining equipment may be any suitable furnace, that employed in the final calcining step being one, of course, which is fully muffled and so constructed that it may be connected into a closed system for delivering the vapors of hydrogen chloride and water through a suitable pipe system into the tank in which the precipitation step is carried out. This furnace may be operated at any suitable temperature required in the calcining step, such as, between 900 degrees C. and 1100 degrees C. or even as low as 600 degrees C. Generally, however, a temperature of about 900 degrees C. is recommended.

My invention is substantially fully cyclic in that the only materials required are sulphuric acid and chloride, both in relatively small amounts. The sulphuric acid is preferably used as a 50% solution. The precipitated and sulphated products obtained in the sulphuric acid precipitation step may be preserved as by-product materials to off-set sulphuric acid cost. In general, however, the amounts of materials involved are such that economies would not dictate the utilization of any of these precipitates for by-product purposes. Only sufficient additional chloride is required to make up for operating and final product losses when such occur. When the process is employed for the production of magnesium oxide as a step in the production of magnesium, hydrochloric acid and sulphuric acid in general may be produced readily on the premises from materials available at the point of operation.

I consider the novelty of my invention to lie in the utilization of hydrogen chloride in a cyclic process for the precipitation of magnesium chloride which may be later calcined to magnesia to produce hydrogen chloride vapor for the precipitation step, and when the leaching step is employed, on ores such as magnesite, brucite, and the like, utilization of the filtrate from the precipitation step in a closed cycle as a leach liquor for the production of additional amounts of magnesium chloride. In practicing the invention, obvious and known purification and other procedures may be employed such as pointed out but the novelty of the invention is defined in the appended claims.

While I ordinarily completely decompose the hydrated magnesium chloride to magnesium oxide, I may, within the scope of my invention, choose to only partially decompose the chloride to yield a magnesium oxide-magnesium chloride mixture suitable for use in the Yerkes process mentioned above, or for similar use in other electrolytic procedures.

What I claim as new and desire to protect by Letters Patent of the United States is:

1. In a process for producing a relatively pure magnesium compound from crude magnesium ores involving the leaching of a basic magnesium substance with an acidic chloride solution, the steps which comprise subjecting the impure leach liquor to a preliminary partial purification, then treating the partially purified solution with hydrogen chloride to precipitate pure crystalline hydrated magnesium chloride, removing the crystalline precipitate, calcining the crystalline precipitate at a relatively low temperature to liberate most of the water and some of the hydrogen chloride, then calcining the partially decomposed residue at a high temperature to liberate substantially all of the remaining combined chlorine as hydrogen chloride, and recovering substantially pure magnesium oxide.

2. The process of claim 1 wherein the mother liquor from the crystalline hydrate precipitation step is combined with the vapors evolved in the low temperature calcination step and the resulting solution is employed to leach further quantities of basic magnesium substance as before.

3. The process of claim 1 wherein the vapors from the high temperature calcination step are returned to the treatment step in which pure crystalline hydrated magnesium chloride is precipitated from the partially purified leach liquor.

4. The process of claim 1 wherein the partially purified leach liquor is treated under super-atmospheric pressure with hydrogen chloride relatively completely to precipitate pure crystalline hydrated magnesium chloride from the partially purified leach liquor.

5. In a process for producing a relatively pure magnesium compound from crude magnesium ores involving the leaching of a basic magnesium substance with an acidic chloride solution, the steps which comprise bringing the impure leach liquor to an acidity of about pH 6.0 to pH 6.5 to precipitate at least a portion of the contained impurities including iron, removing the precipitate, then treating the partially purified solution with hydrogen chloride gas to salt out a relatively pure hydrated magnesium chloride in crystalline form.

6. In a process for producing a relatively pure magnesium compound from crude magnesium ores involving the leaching of a basic magnesium substance with an acidic chloride solution, the steps which comprise treating the impure leach liquors with a substance yielding sulfate ions to precipitate at least a portion of the contained impurities including calcium, removing the precipitate, then treating the partially purified solution with hydrogen chloride gas to salt out a relatively pure hydrated magnesium chloride in crystalline form.

7. A process for the production of a relatively pure magnesium compound from an acidic impure solution thereof which comprises bringing the pH of such a solution to a point within the slightly acid range to precipitate a substantial portion of the iron and other impurities soluble in strongly acid solutions, removing and discarding the precipitate, treating the resulting solution with a substance yielding sulfate ions to precipitate a substantial portion of the impurities forming relatively insoluble sulfates including undesired alkaline earth metals, removing and discarding the precipitate, then treating the thus partially-purified solution with hydrogen chloride to precipitate a relatively pure, crystalline compound comprising hydrated magnesium chloride leaving any residual impurities still in solution, and separating and recovering the desired crystalline magnesium compound.

8. In a process for producing a relatively pure magnesium compound from crude magnesium ores involving the leaching of a basic magnesium substance with an acidic chloride solution, the steps which comprise subjecting the impure leach liquor to a preliminary partial purification, then treating the partially purified solution with hydrogen chloride to precipitate pure crystalline hydrated chloride, removing the crystalline precipitate, calcining the crystalline precipitate at a relatively low temperature of the order of 250 degrees centigrade to liberate most of the water and some of the hydrogen chloride, then calcining the partially decomposed residue at an elevated temperature of 900 degrees centigrade to 1100 degrees centigrade to liberate substantially all of the remaining combined chlorine as hydrogen chloride, and recovering substantially pure magnesium oxide.

9. A process for the production of a relatively pure magnesium compound from an acidic impure solution thereof which comprises bringing the acidity of such a solution to a point within the slightly acid range of pH 6.0 to about pH 6.5 to precipitate a substantial portion of the iron and other impurities soluble in strongly acid solutions, removing and discarding the precipitated impurities, incorporating with the resulting solution sufficient sulfuric acid to precipitate a substantial proportion of undesired alkaline earth metal impurities, removing and discarding the precipitated impurities, then incorporating with the thus partially-purified solution sufficient gaseous hydrogen chloride to precipitate a substantial proportion of the magnesium content of the solution in the form of a relatively pure crystalline hydrated magnesium chloride, and separating and recovering the desired crystalline magnesium compound.

10. A process for the production of a relatively pure magnesium compound from an impure ore thereof which comprises leaching an acid soluble magnesium ore with an acidic chloride solution, subjecting the resulting magnesium-bearing solution to at least partial purification, treating the partially purified solution with hydrogen chloride to precipitate relatively pure hydrated magnesium chloride, removing and recovering said purified hydrated magnesium chloride, and returning the remaining solution to leach further quantities of magnesium ore as before.

11. In a process for the production of a relatively pure magnesium compound from an impure ore thereof, the steps which comprise leaching an acid-soluble magnesium-bearing material with hydrochloric acid solution to yield a solution containing magnesium chloride and impurities, subjecting said solution to purification to eliminate a substantial proportion of the contained impurities, then treating the resulting solution with hydrogen chloride to salt out a relatively pure hydrated magnesium chloride leaving a strongly acidic mother liquor, recovering said hydrated magnesium chloride and calcining it at a relatively low temperature to expell in vapor form most of the water and some hydrogen chloride leaving a residue, combining the expelled vapors with the strongly acid mother liquor and returning the mixture to treat additional magnesium-bearing material as before, then heating the low-temperature calcined residue at an elevated temperature sufficient to expel the remainder of the combined chlorine as hydrogen chloride yielding a residue of pure magnesium oxide, and returning the evolved gaseous hydrogen chloride to salt out further quantities of hydrated magnesium chloride as before.

REX R. LLOYD.

REFERENCES CITED

The following references are of record in the file of this patent:

UNITED STATES PATENTS

| Number | Name | Date |
|---|---|---|
| 1,327,536 | Elliot | Jan. 6, 1920 |
| 2,019,265 | Laird | Oct. 29, 1935 |
| 2,144,339 | Laist | Jan. 17, 1939 |
| 2,216,402 | Muller | Oct. 1, 1940 |
| 2,255,607 | Ayers | Sept. 9, 1941 |
| 2,288,610 | Dean | July 7, 1942 |

FOREIGN PATENTS

| Number | Country | Date |
|---|---|---|
| 21,261 | Great Britain | 1914 |
| 153,500 | Great Britain | Jan. 19, 1920 |
| 217,568 | Great Britain | May 14, 1925 |
| 484,136 | Great Britain | May 2, 1938 |

OTHER REFERENCES

Seidell, "Solubilities of Inorganic and Organic Compounds," vol. 1, page 387; D. Van Nostrand, N. Y. (1919).

Mellor, Treatise on Inorganic and Theoretical Chemistry, vol. II, pp. 34, 164; vol. IV, pp. 299, 300, 301 and 303. Publ. by Longmans, Green & Co., London; vol. II in 1922 and vol. IV in 1923.

Britton, Hydrogen Ions, page 48, D. Van Nostrand Co., N. Y. (1929).